(12) United States Patent
Pan et al.

(10) Patent No.: US 7,526,714 B2
(45) Date of Patent: Apr. 28, 2009

(54) APPARATUS FOR CHECKING DATA COHERENCE, RAID CONTROLLER AND STORAGE SYSTEM HAVING THE SAME, AND METHOD THEREFOR

(75) Inventors: Jui-Yao Pan, Xindian (TW); Jung-Yao Chen, Taipei (TW)

(73) Assignee: Infortrend Technology, Inc., Taipei Hsien (TW)

( * ) Notice: Subject to any disclaimer, the term of this patent is extended or adjusted under 35 U.S.C. 154(b) by 376 days.

(21) Appl. No.: 11/088,739

(22) Filed: Mar. 25, 2005

(65) Prior Publication Data
US 2005/0228842 A1 Oct. 13, 2005

(51) Int. Cl.
G06F 11/10 (2006.01)
(52) U.S. Cl. ...................................................... 714/770
(58) Field of Classification Search .................. 714/805, 714/770
See application file for complete search history.

(56) References Cited
U.S. PATENT DOCUMENTS

| | | | | |
|---|---|---|---|---|
| 3,752,394 A | * | 8/1973 | Igel | 708/234 |
| 3,949,208 A | * | 4/1976 | Carter | 714/765 |
| 4,181,934 A | * | 1/1980 | Marenin | 710/40 |
| 4,276,595 A | * | 6/1981 | Brereton et al. | 712/207 |
| 5,289,478 A | * | 2/1994 | Barlow et al. | 714/770 |
| 5,299,319 A | * | 3/1994 | Vassiliadis et al. | 712/221 |
| 5,375,127 A | * | 12/1994 | Leak et al. | 714/772 |
| 5,745,507 A | * | 4/1998 | Chen | 714/763 |
| 5,950,225 A | * | 9/1999 | Kleiman | 711/111 |
| 5,978,825 A | * | 11/1999 | Divine et al. | 708/525 |
| 6,883,131 B2 | * | 4/2005 | Acton | 714/755 |
| 6,891,690 B2 | * | 5/2005 | Asano et al. | 360/53 |

* cited by examiner

Primary Examiner—Stephen M Baker
(74) Attorney, Agent, or Firm—Troxell Law Office PLLC

(57) ABSTRACT

Data coherence checking apparatus, a redundant array of independent disks (RAID) controller and a storage system having the checking apparatus and a method therefor are proposed. The present invention employs an XOR operation unit and an OR operation unit to check the coherence of data to be checked. The XOR operation unit is used to perform XOR operation on the data to be checked. After the XOR operation unit finishes performing the XOR operation on the data of a processing set, it outputs an XOR operation result to the OR operation unit to perform OR operation so as to obtain a check result.

48 Claims, 11 Drawing Sheets

APPARATUS FOR CHECKING DATA COHERENCE, RAID CONTROLLER AND STORAGE SYSTEM HAVING THE SAME, AND METHOD THEREFOR

BACKGROUND OF THE INVENTION

1. Field of the Invention

The present invention is related to a data checking technique, and more particularly, to an apparatus for checking data coherence, a redundant array of independent disks (RAID) controller and a storage system having the same, and a method therefor.

2. Description of Related Art

During data transmission, errors always occur in the transmitted data due to whatever reasons. For a receiving end, the data become unreliable after being transmitted. For example, when data are transmitted in a communication environment on the Internet, such as through Internet small computer system interface (iSCSI), the transmitted data usually have errors therein. Hence, there are various error detection methods or apparatuses used to solve this problem in the present, in which cycle redundancy check (CRC) codes are used most often. If the errors can be detected, through the CRC codes, for example, the receiving end can request the transmission end to send the data again, and the transmitted data can be protected thereby.

While data in transmission can be protected through the above-mentioned technologies, data stored in a memory device may be protected by redundant data (or check data) corresponding thereto. For example, the data stored in a RAID (Redundant Array of Independent Disks) data storage architecture may have check data with it. While data stored may have check data with it for protecting its coherence, there could be the situation that the data read from memory devices such as from disk drives, including the regular data and its check data, is not coherent to each other for whatever reasons.

Accordingly, to provide an apparatus and method for checking data coherence is an urgent need to fulfill.

SUMMARY OF THE INVENTION

An objective of the present invention is to provide an apparatus for checking data coherence of data to be checked, such as data read from a data storage device providing data storage space, a controller and a data storage system thereof, and a method therefor.

A further objective of the present invention is provide an apparatus for checking data coherence which can perform the data coherence checking on data to be check efficiently, a controller and a data storage system thereof, and a method therefor.

Accordance to a first embodiment of the invention, an apparatus for checking data coherence is provided, in which the data read to be checked for data coherence can be arranged into at least one processing set each comprising sections of data including regular data and its associated check data, such as parity data. The apparatus comprises an XOR operation unit for performing XOR operation on of each the at least one processing set to generate an XOR operation result; and, an OR operation unit for performing OR operation on the XOR operation result to generate an OR operation result.

Accordance to a second embodiment of the invention, an apparatus for checking data coherence is provided. The apparatus comprises an XOR operation module for receiving a first input data and a section of the data to be checked and performing XOR operation on the first input data together with the section of the data to be checked to generate an XOR operation result; a buffer unit for temporarily storing the XOR operation result and outputting the XOR operation result to the XOR operation module as a second input data so that the XOR operation module performs XOR operation on the second input data together with a next section of the data to be checked;, and, an OR operation unit for receiving the XOR operation result of each of the at least one processing set to perform OR operation so as to generate an OR operation result, in which the buffer unit provides the XOR operation result of the at least one processing set one at a time to the OR operation unit to perform OR operation, and the OR operation unit performs OR operation on the generated OR operation result together with the XOR operation result of next of the at least one processing set.

Accordance to a third embodiment of the invention, a method for checking data coherence is provided. The method comprises the following steps: performing XOR operation on the data to be checked of each of the at least one processing set to generate an XOR operation result; and, performing OR operation on the XOR operation result to generate an OR operation result.

Accordance to a fourth embodiment of the invention, a controller having the functionality of checking data coherence is provided. The controller comprises a memory unit for temporarily storing data of at least one processing set of data to be checked; and, an XOR engine for checking the data of the at least one processing set; wherein the XOR engine comprises: an XOR operation module for performing XOR operation on each of the processing set to generate an XOR operation result; and, an OR operation unit for performing OR operation on the XOR operation result to generate an OR operation result.

Accordance to a fifth embodiment of the invention, a data storage subsystem having the functionality of checking data coherence is provided. The data storage subsystem comprises a data storage device for providing data storage space; and, a controller coupled to the data storage device, the controller comprising: a memory unit for temporarily storing a plurality of data to be checked, wherein the plurality of data to be checked can be arranged into at least one processing set, and each of the at least one processing set comprises at least one regular data section and at least one check data section corresponding to the at least one regular data section; and, a data coherence checking unit for checking coherence of the data to be checked, the data coherence checking unit further comprises: an XOR operation unit for performing XOR operation on data of each the processing set to generate an XOR operation result corresponding to the at least one processing set; and, an OR operation unit for performing OR operation on the XOR operation result of the at least one processing set so as to generate an OR operation result.

Accordance to a sixth embodiment of the invention, a data storage system having the functionality of checking data coherence is provided. The data storage system comprises a host; a data storage apparatus for providing data storage space; and, a controller coupled between the host and the storage apparatus, the controller comprising: a memory unit for temporarily storing a plurality of data to be checked, wherein the plurality of data to be checked can be arranged into at least one processing set, which comprises at least one regular data section and at least one check data section corresponding to the at least one regular data section; and, a data coherence checking unit for checking coherence of the data to be checked, the data coherence checking unit further comprises: an XOR operation unit for performing XOR operation on data of each of the at least one processing set to generate a corresponding XOR operation result; and, an OR operation unit for receiving the XOR operation result of the at least one processing set to perform OR operation so as to generate an OR operation result.

These and various other features and advantages which characterize the present invention will be described in the detailed description.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
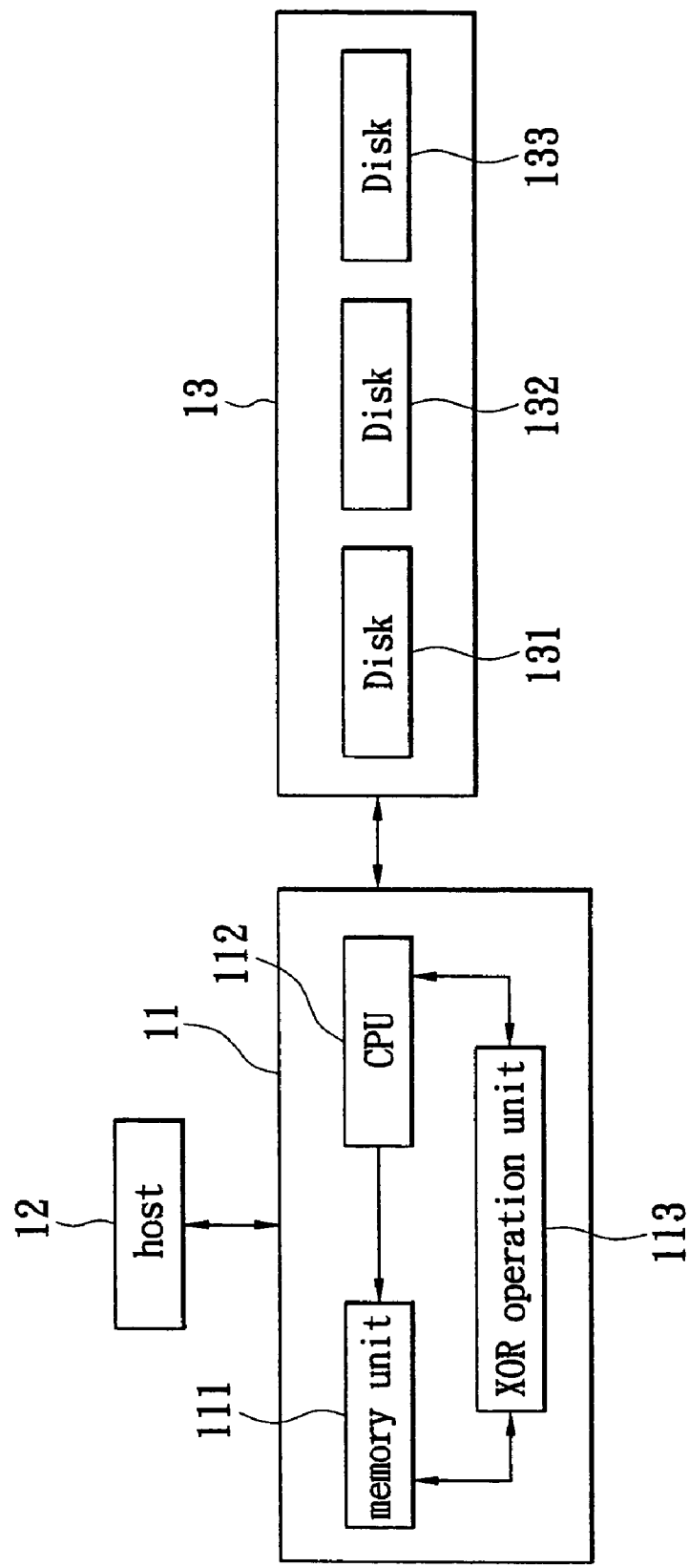
FIG. 1 is a schematic diagram illustrating an embodiment of the storage system architecture in accordance with the present invention.

The present invention is provided for checking data coherence, in which the data can be data read off from disk drives or data transmitted from the host, but is not limited to such exemplified instances. The preceding data to be checked comprises regular data and parity data thereof (or data having the property of the parity data, such as backup data of RAID1, which is also called "check data"). The operation of an embodiment of the present invention may be expressed by the following equations:

Desti=S1⊕S2⊕ ... ⊕Sn;

Ei=the OR operation result obtained by performing the OR operation on every bit of Desti;

Cm=E1|E2| ... |Em;

where "n" is the number of data chunks in a stripe, "i" indicates the ith stripe, S1~Sn−1 represent regular data, Sn represents the parity data, Desti (=Destination i) represents the XOR operation result of the regular data and parity data in a stripe, Ei represents the OR operation result obtained by performing the OR operation on every bit of Desti, "Em" indicates the mth processing set, Cm is the final check value, "⊕" represents XOR operator, "|" represents OR operator. Thus, the present invention performs the XOR operation on the regular data together with its parity data and then performs the OR operation on the XOR operation result together with a predetermined operation value. Thereafter, the present invention performs the OR operation on the result of OR operation together with the next XOR operation result repeatedly. Lastly, the final OR operation result is regarded as a check value for checking the coherence of the data. The present invention uses the check value to determine whether the data checked is correct or not. The implementation of the present invention is detailed as follows.

The embodiments of the present invention, as examples, are used to check the data accessed from the storage system, though, of course, the present invention can also be applied to other situations for data checking. In storage systems, RAID is a common storage architecture. It mainly comprises RAID0, RAID1, RAID2, RAID3, RAID4; RAID5, RAID6 and their combinations. In a data storage system of RAID1, RAID2, RAID3, RAID4, RAID5 or RAID6, redundant data (check data) is used to keep the coherence of data; namely, the user data (regular data) is stored together with its check data. In a data storage system of RAID3, RAID4, and RAID5, multiple user data or regular data sections are protected through the corresponding parity data section. The parity data is generated by performing XOR (exclusive OR) operation on the corresponding multiple regular data. If there is an error on one section of the regular data section while the corresponding data on other regular data section(s) and the corresponding parity data section is correct, the coherence of the data will be broken, since the result new parity data by performing XOR operation on the regular data will not be coherent to (or, not be the same as) the original parity data. In a storage system of RAID 1, the check data is the same as the regular data, but the check data still has the property of parity data. In a storage system of RAID 6, the same regular data can be protected multidimensionally by the parity data. For example, two errors occurred in two separate data sections of the same data sections which comprise the regular data sections and the corresponding check data sections can be detected and corrected.

Reference is made to FIG. 1, which is a schematic diagram illustrating an embodiment of the data storage system architecture in accordance with the present invention. The storage system comprises a RAID controller 11, a host 12 and a disk array 13, wherein the RAID controller 11 comprises a memory unit 111 and a CPU 112 and the disk array 13 comprises a plurality of disk drives 131, 132, 133. When the host 12 reads the data stored in the disk drives 131, 132, 133, it reads the target data through the RAID controller 11 and the target data read is temporarily stored in the memory unit 111 and is transmitted to the host 12 from the memory unit 111 thereafter. When the RAID controller 11 reads the target data stored in the disk drives 131, 132, 133, however, the target data may be erroneous due to the media error or other errors of the disk drives. 131, 132, 133 while there is no error message generated. Therefore, according to the present embodiment, the RAID controller 11 performs an XOR operation on the target data (including regular data and its parity data) first and an OR operation on the result of an XOR operation result thereafter to check whether the read target data is coherent to each other.

Figure 2A:
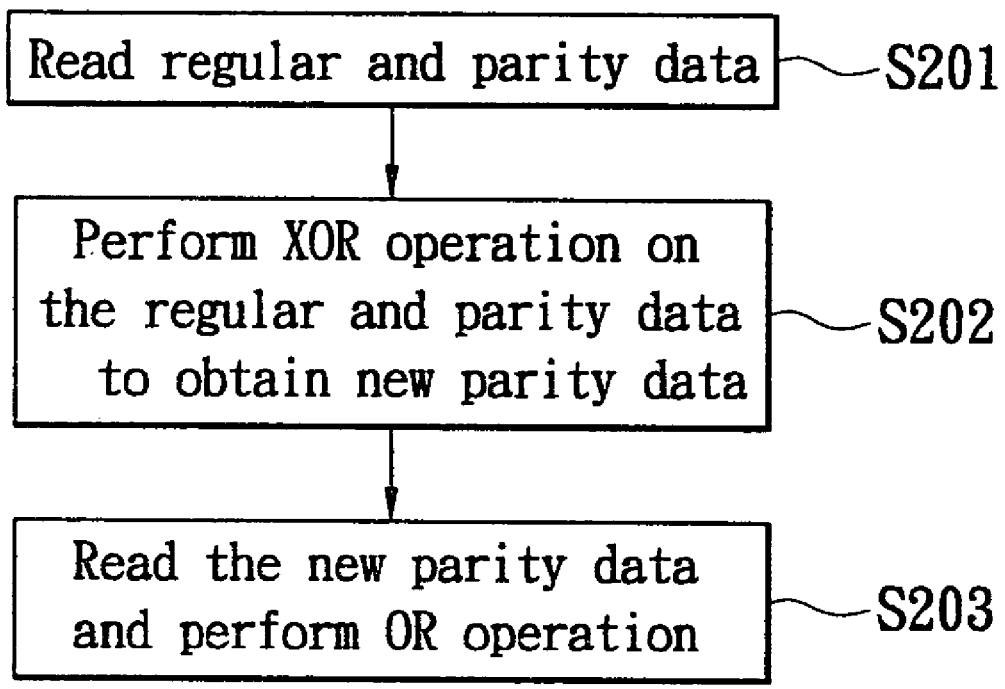
FIGS. 2a, 2b, and 2c are schematic diagrams illustrating an embodiment of the data checking operation used in RAID3, RAID4 or RAID5 architecture in accordance with the present invention.
Figure 2B:
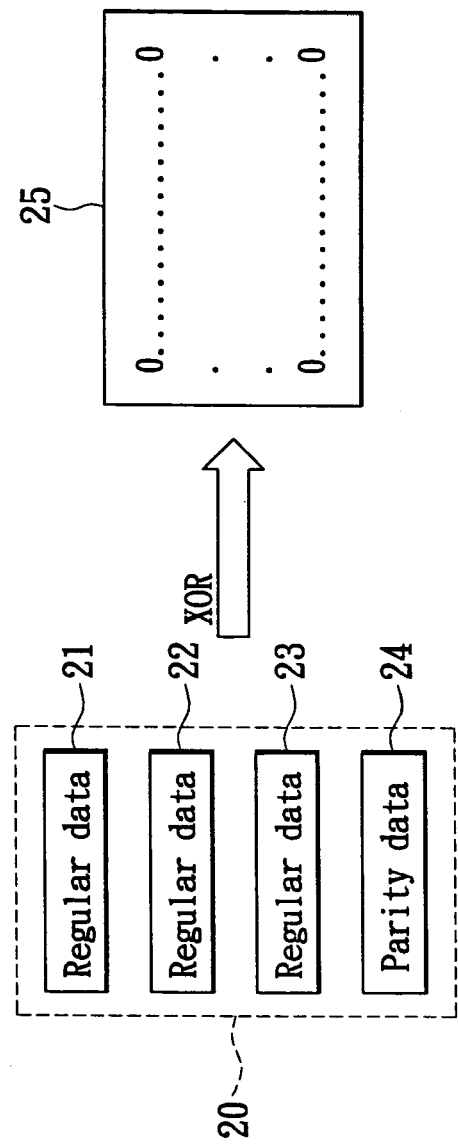
Figure 2C:
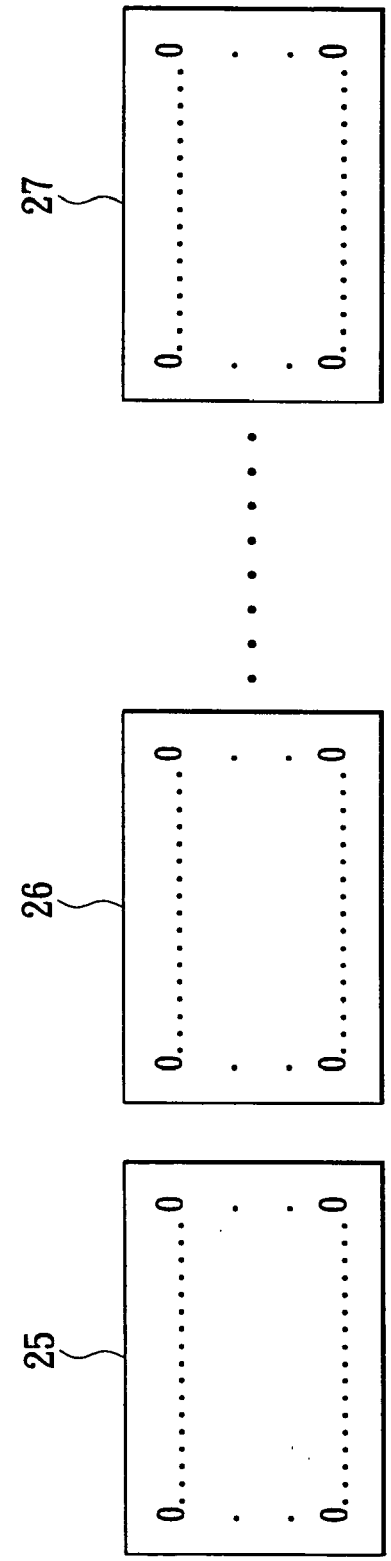

Reference is made to FIG. 1 together with FIGS. 2a, 2b, and 2c, which are schematic diagrams for illustrating an embodiment of the data checking operation used in RAID3, RAID4 or RAID5 architecture in accordance with the present invention. When the RAID controller 11 reads the data stored in the disk drives, a plurality of regular data sections 21, 22, 23 and the parity data section 24 thereof in the same stripe are read at a time (step S201) and stored in the memory unit 111. Subsequently, XOR operation is performed on the regular data sections 21, 22, 23 and the parity data section 24 read out from the memory unit 111 to generate a new parity data section 25. Since the parity data section 24 is generated via performing the XOR operation on the regular data sections 21, 22, 23, the parity data section 24 should be coherent to the regular data sections 21, 22, 23. Hence, if the regular data sections 21, 22, 23 are read without error, each of the content values of the new parity data section 25, which is result parity value of the XOR operation on the regular data sections 21, 22, 23 and the parity data section 24, should have a False value ("0"). At this moment, the RAID controller 11 still does not know the content values of the new parity data section 25 (step S202).

In general, the target data comprises lots of regular data sections 21, 22, 23 and parity data section 24, and therefore, a plurality of new parity data sections 25, 26, 27 will be generated, as shown in FIG. 2c. Since the RAID controller 11 does not know the content values of the new parity data sections 25, 26, 27 (each of the new parity data sections 25, 26, 27 contains a plurality of content values, ('0' or '1')) at the moment they are generated, the RAID controller 11 cannot determine whether the target data read is correct or not based on the new parity data sections 25, 26, 27. Therefore, the CPU 112 has to read out the parity data 25, 26, 27 from the buffer 111 to obtain their content values and then performs the logic OR operation on these contents.

The OR operation is then performed on these content values (step 203). If the result value of the OR operation is "True" ("1"), which occurs when any one bit of the content values of parity data sections 25, 26, 27 is "True" ("1"), it indicates the target data read is incorrect. If the result value of the OR operation is "False" ("0"), which occurs when all of the content values of parity data sections 25, 26, 27 are False ("0"), it indicates the target data read is correct, and therefore the target data read will be transmitted to the memory unit 111, and further to the host 12 thereafter.

In the present embodiment, although the OR operation in the step 203 is performed by using the XOR operation unit 113, it should be noted that, the XOR operation and the OR operation can both performed by the CPU 112.

Figure 3:
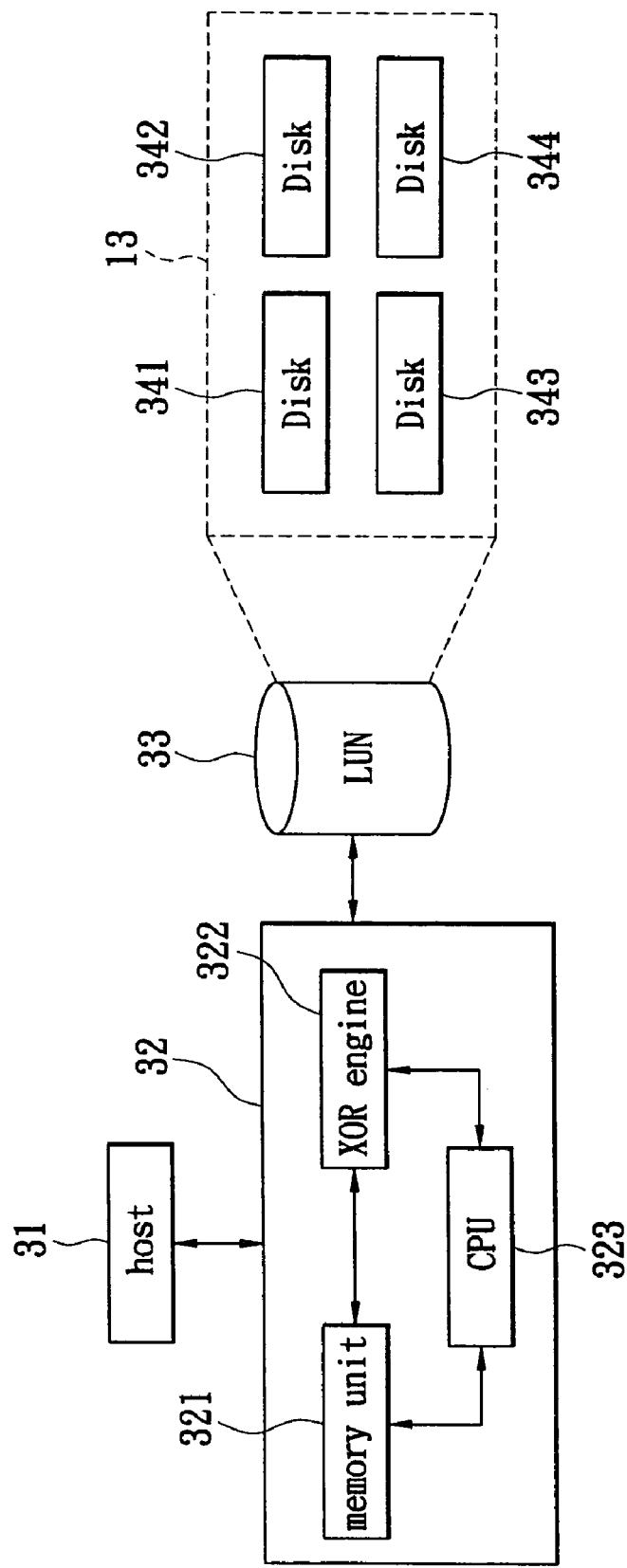
FIG. 3 is a schematic diagram illustrating an alternate embodiment of the storage system architecture in accordance with the present invention.

Reference is made to FIG. 3, which is a schematic diagram illustrating an alternate embodiment the storage system architecture in accordance with the present invention. It mainly comprises a host 31, a RAID controller 32 and a logical disk drive (LUN) 33. The RAID controller 32 comprises a memory unit 321, an XOR engine 322 and a CPU 323. The RAID controller 32 and the LUN 33 configured from a plurality of disk drives 341, 342, 343, 344 form a storage subsystem. In this embodiment, the memory unit 321 can be a common memory device, such as double data rate synchronous dynamic random access memory (DDR SDRAM) or synchronous dynamic random access memory (SDRAM), and has a capacity of 1 GB, for example. The disk drives 341, 342, 343, 344 can be configured to form a disk array 34. For example, when this embodiment of the present invention is applied to RAID 3 or RAID 4 architecture, the disk drives 341, 342, 343, 344 form the LUN 33, wherein all of the parity data are stored in the same one disk drive, e.g., disk drive 344 while the regular data thereof are stored in other disk drives, such as disk drives 341, 342, 343 in this example. When this embodiment is applied to RAID 5 architecture, the regular and parity data is distributively stored in the disk drives 341, 342, 343, 344. An example for checking data read out from the LUN 33 by the host 31 is described as follows.

When the host 31 reads the data in the LUN 33, it issues an input/output (I/O) request to the RAID controller 32 to read the data stored in the LUN 33 via the RAID controller 32. In this embodiment, when the RAID controller 32 reads the data stored in the LUN 33, it stores the obtained data in the memory unit 321 and then performs XOR operation and OR operation on the obtained data, i.e., the data to be checked, through the XOR engine 322 to determine whether the obtained data is correct or not. If the obtained data is correct, the data stored in the memory unit 321 is transmitted to the reading end (host 31). If the obtained data is not correct, the RAID controller 32 performs a corresponding action, such as re-reading the data or regenerating the data. The operation of the present embodiment is detailed as follows.

Figure 4A:
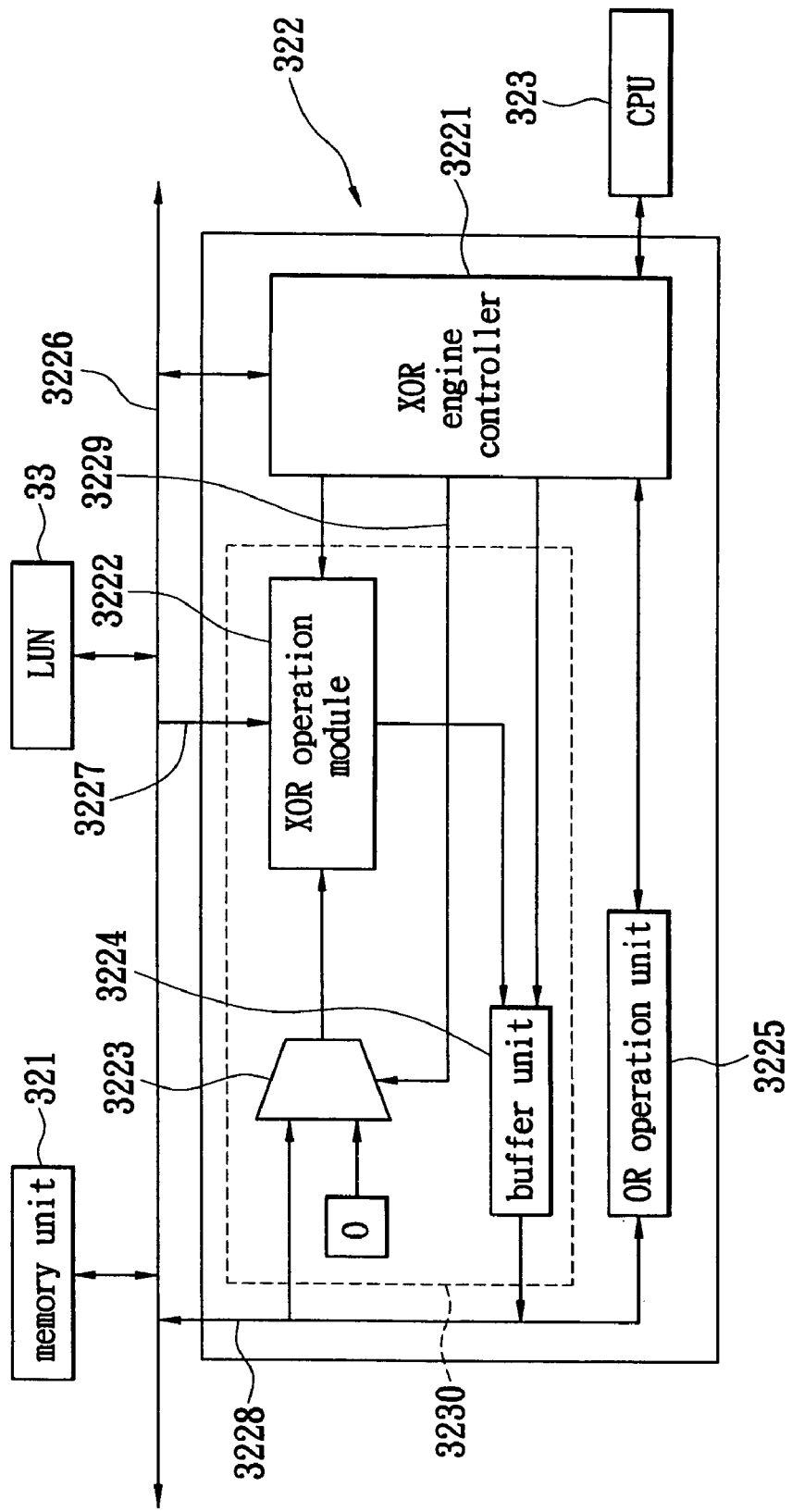
FIG. 4a is schematic diagram illustrating an embodiment of the internal operation of the XOR engine in accordance with the present invention.

Reference is made to FIG. 4a, which is a schematic diagram illustrating an embodiment of the internal operation of the XOR engine 322 in accordance with the present invention. It mainly comprises an XOR engine controller 3221, an XOR operation module 3222, a multiplexing selector 3223, a buffer unit 3224 and an OR operation unit 3225. Therein, the multiplexing selector 3223 is arranged between the XOR operation module 3222 and the buffer unit 3224. The XOR engine controller 3221 is not only utilized to control the XOR operation module 3222, the multiplexing selector 3223 and the buffer unit 3224, but also to communicated with the CPU 323 and other components inside the RAID controller 32.

A data bus 3226 is arranged between the XOR engine 322, the memory unit 321 and the LUN 33. In addition, a reading bus 3227 and a writing bus 3228 are arranged between the XOR engine 322 and the data bus 3226 so that the RAID controller 32 can transfer the read data to the memory unit 321 through the data bus 3226 and that CPU 323 controls the XOR engine controller 3221 to perform the coherence checking of the data to be checked in the memory unit 321 through the data bus 3226, the reading bus 3227 and the writing bus 3228. In this embodiment, the XOR operation module 3222, the multiplexing selector 3223, and the buffer unit 3224 form an XOR operation unit 3230, which is shown in the figure surrounded by a dash line. Under the control of the XOR engine controller 3221, the XOR operation unit 3230 receives data from reading data bus 3227 to perform XOR operation and transfers the result to OR operation unit 3225 through the writing bus 3228 for further operation.

In more detail, the function of the XOR operation unit 3230 is to perform XOR operation on the received data under the control of the XOR engine controller 3221. Therefore, the XOR operation unit 3230 can be used at least in two ways. First, the XOR operation unit 3230 can be used to perform XOR operation on received data to generate parity data, in which the received data could be data to be written into the disk array associated with a write request. In this case, the XOR operation unit 3230 receives a plurality of regular data and performs the XOR operation on them to generate parity data corresponding to the regular data. Then, the parity data are written to the memory unit 321 via the writing bus 3228 and then to a destination device, such as a disk drive, from the memory unit 321. Second, the XOR operation unit 3230 can be used to perform XOR operation on received data for checking the coherence of the received data. In such a circumstance, it should cooperate with other functional block of the XOR engine 322, such as the OR operation unit 3225, to fulfill the function.

Figure 4B:
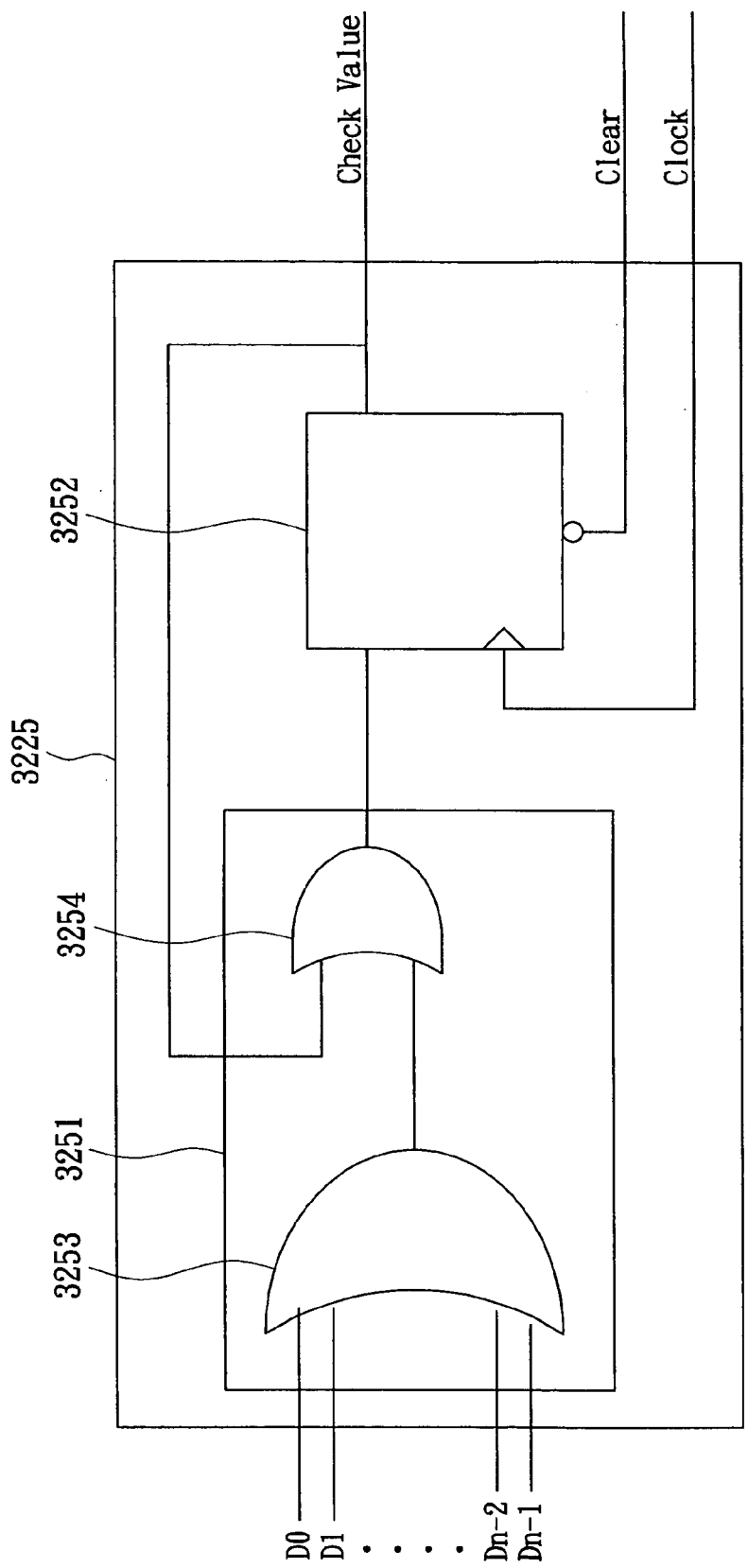
FIG. 4b is a schematic diagram illustrating an embodiment of the internal circuit of the OR operation unit in accordance with the present invention.

Reference is made to FIG. 4b, which is a schematic diagram of an embodiment of the internal circuit of the OR operation unit 3225 (e.g., a Flip-Flop unit) in accordance with the present invention. It comprises an OR operation module 3251 and a latch unit 3252, wherein the OR operation module 3251 comprises OR logic circuits 3253, 3254. The OR logic circuit 3253 has multiple input pins (D0~Dn−1), which are used to receive the XOR operation result outputted from the buffer unit 3224. In this embodiment, the number of the input pins can be, for example, 128, but the present invention is not limited thereto. The output of the OR logic circuit 3253 is connected to one of the inputs of the OR logic circuit 3254. The other input of the OR logic circuit 3254 is connected to an output of the latch unit 3252. The output of the OR logic circuit 3254 is connected to an input of the latch unit 3252. The latch unit 3252 not only receives the output result of the OR logic circuit 3254, but also receives a clear signal (Clear) and a clock signal (Clock), wherein the clear and clock signals are provided by the XOR engine controller 3221. The output of the latch unit 3252 is a check value. The operative relation between the OR logic circuits 3253, 3254 and the latch unit 3252 will be described later.

Figure 5A:
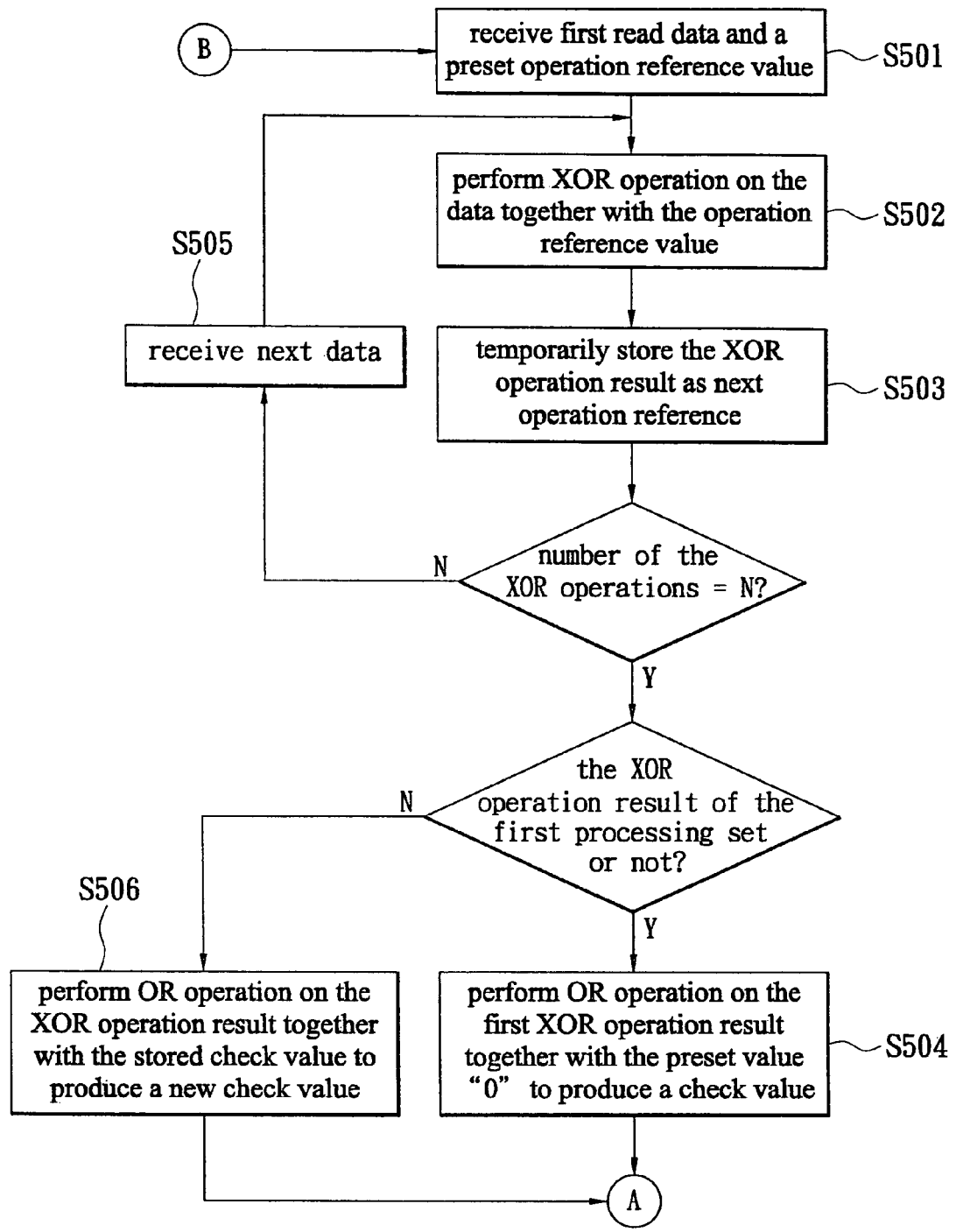
FIGS. 5a and 5b are an embodiment of operative flowcharts of the present invention.
Figure 5B:
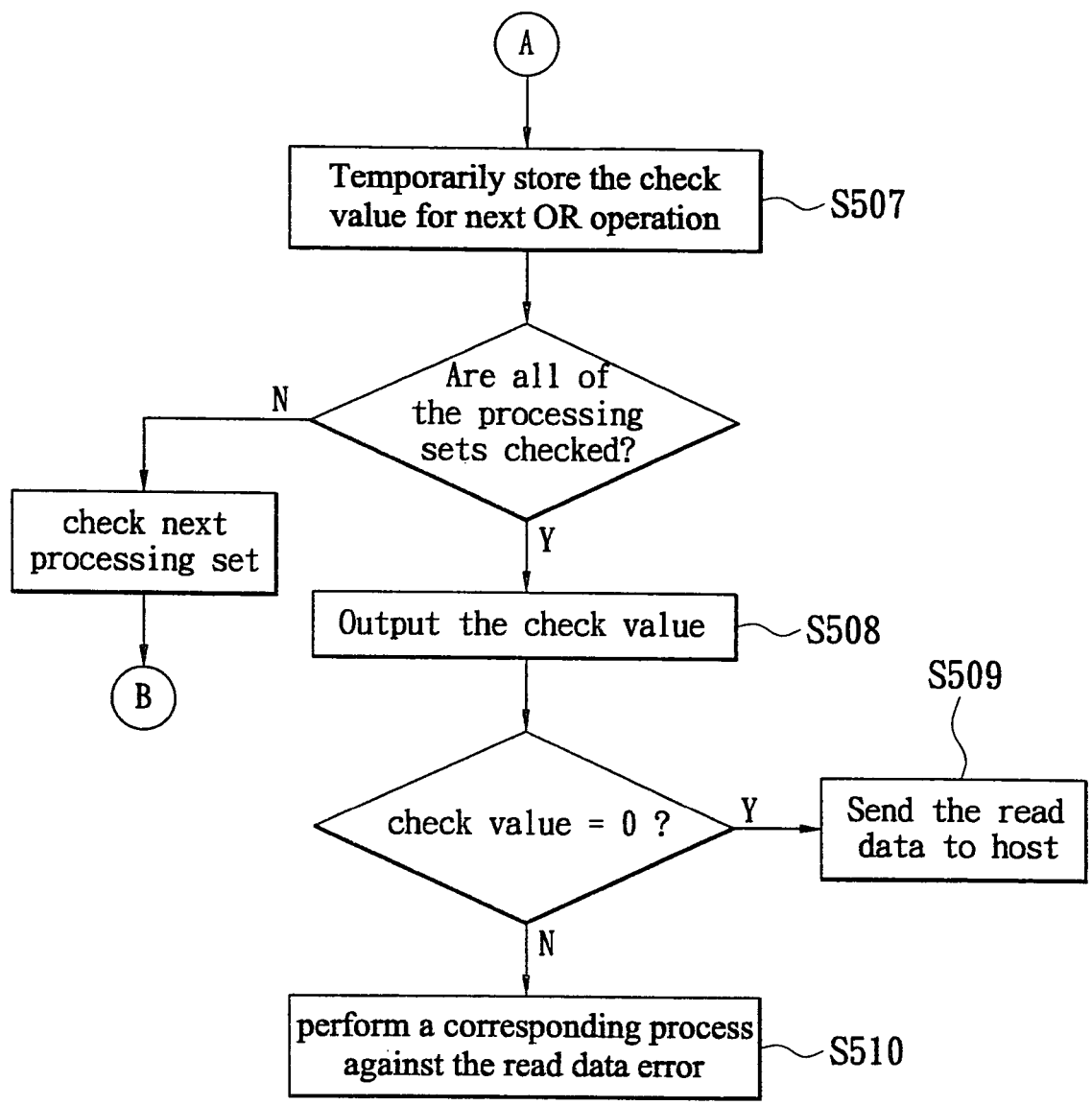
Figure 6:
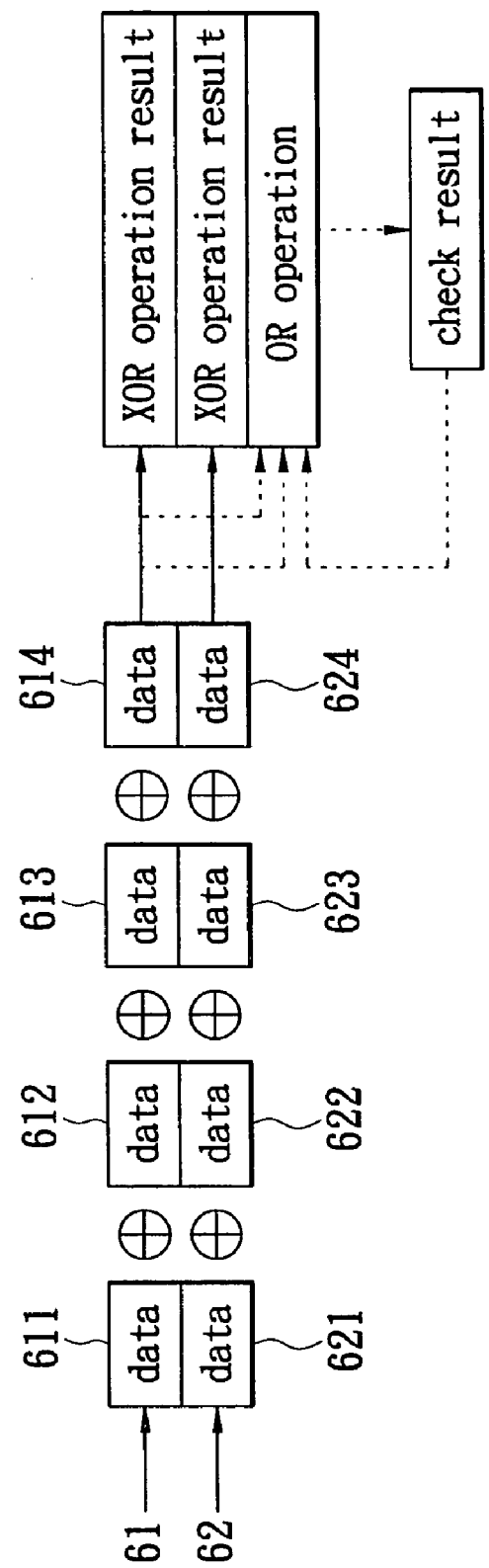
FIG. 6 shows a schematic diagram illustrating an embodiment of the operation of processing the data to be checked in accordance with the present invention; and, FIGS. 7a and 7b show schematic diagrams illustrating an embodiment of the data checking operation in accordance with the present invention.
Figure 7A:
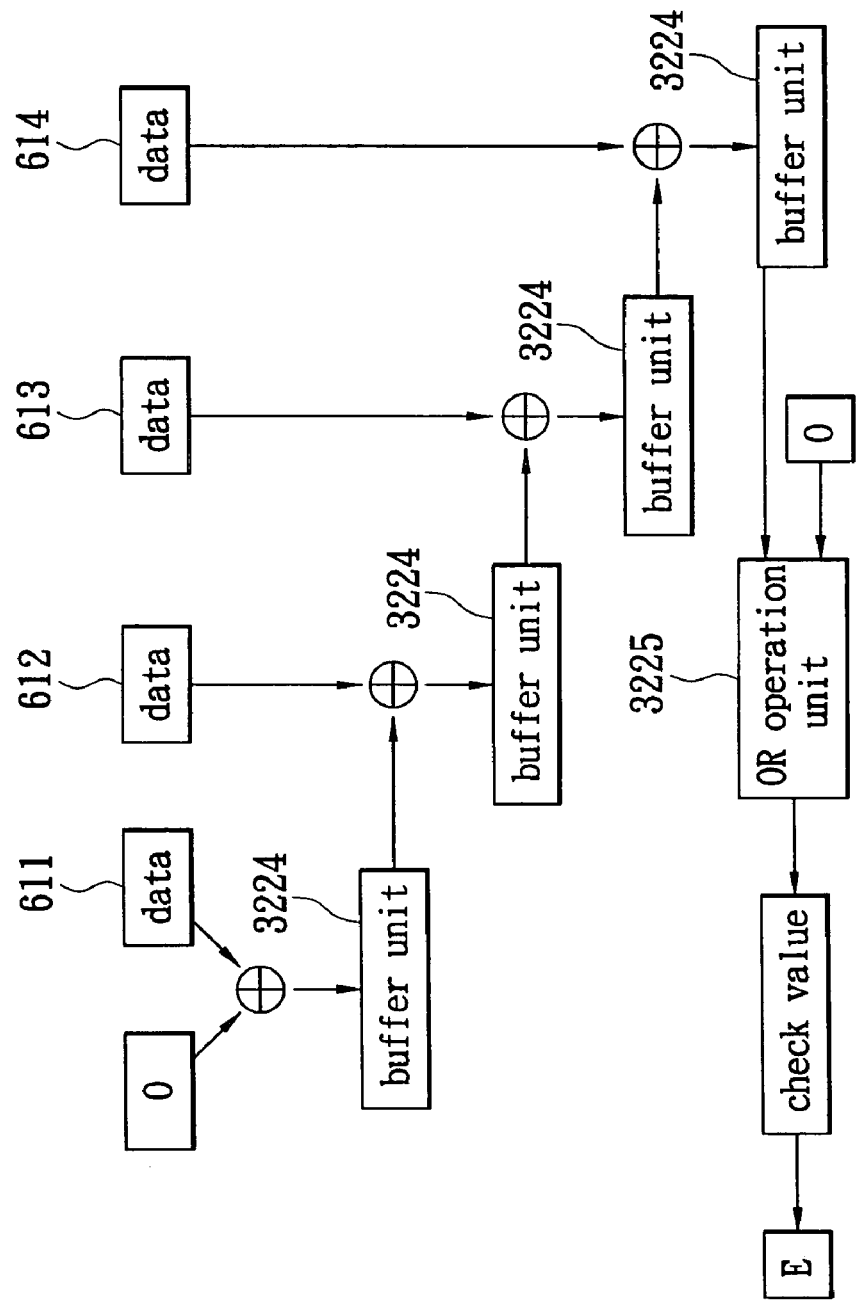
Figure 7B:
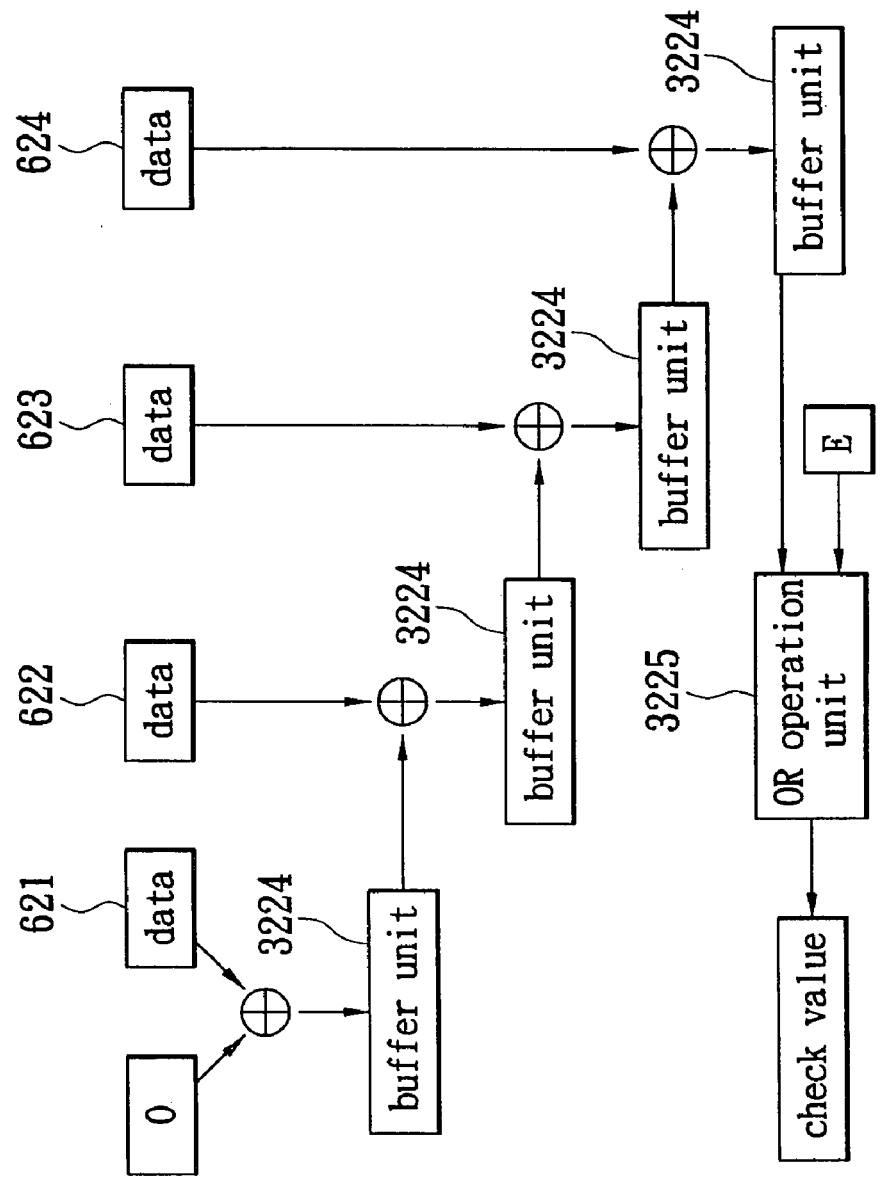

Reference is made to FIGS. 5a and 5b, which are operative flowcharts of an embodiment of the the present invention. Please also refer to FIGS. 3, 4a, 4b, 6, 7a and 7b together. Therein, FIG. 6 shows a schematic diagram illustrating an embodiment of the operation of processing the data to be checked in accordance with the present invention. FIGS. 7a and 7b show schematic diagrams illustrating an embodiment of the data checking operation in accordance with the present invention. In this embodiment, the host 31 reads the data of the two stripes 61, 62, including data sections 611-614 and 621-624, respectively, from the LUN 33 by way of the RAID controller 32, in which the stripe 61 comprises the data sections 611-614 and the stripe 62 comprises the data sections 621-624. Regarding the definition of the stripes 61, 62, reference can be made to "The RAID book, Sixth Edition, Paul Massiglia, RIAD Advisory Board."

When the host 31 wants to read the data sections 611, 612, 613, 614, 621, 622, 623, and 624, a data read request is issued to the RAID controller 32. When the RAID controller 32 receives the read request, it starts reading the LUN 33 to obtain the data sections 611-614 and 621-624, and then temporarily stores them to the memory unit 321. Thereafter, the CPU 323 controls the XOR engine controller 3221 to read data sections 611-614 and 621-624 via the data bus 3226. Then the XOR engine controller 3221 controls the XOR operation module 3222 to receive the data sections 611-614, 621-624 via the data bus 3226 and the reading bus 3227 and perform the XOR operation on them. When the XOR operation module 3222 receives the first data section of each stripe, such as data section 611 of the stripe 61, the XOR engine controller 3221 sends a selection signal via control signal line 3229 to the multiplexing selector 3233 to make the multiplexing selector 3233 select a predetermined operation reference value, e.g., "0", and output it to the XOR operation module 3222, wherein the XOR operation module 3222 only receives one operation reference value and one section of read data, such as data section 611, when it receives the operation input values (step S501).

After the XOR operation module 3222 receives the predetermined operation reference value ("0") and the data section 611, it performs an XOR operation on them to obtain an XOR operation result, i.e., new parity data (step S502). In this embodiment, since the XOR operation module 3222 only receives the first data section 611 of the stripe 61 in the beginning, it cannot perform the XOR operation on the data section 611 together with the next data section 612 at this moment. Hence, in this embodiment, the predetermined operation reference value "0" is inputted to the XOR operation module 3222 via the multiplexing selector 3223 for performing the XOR operation with the data section 611. Since the XOR operation has the nature of A⊕0=A, the XOR operation result obtained by performing the XOR operation on the data section 611 and the predetermined operation reference value "0" is the same as the original value of the data section 611. The purpose of this operation is to store the first data section 611 of the stripe 61 in the buffer unit 3224 so that the XOR operation module 3222 can perform the XOR operation on the data section 611 together with the next data section 612 later.

As described above, the XOR operation module 3222 outputs the XOR operation result, i.e., data section 611, to the buffer unit 3224 for temporarily storing as the next operation reference value of the XOR operation module 3222 (step S503). Therefore, the XOR engine controller 3221 counts the number of XOR operations to determine whether the number of the XOR operations performed by the XOR operation module 3222 is equal to the predetermined operation number N, e.g., 4. The value of N is 4 because each of the stripes 61, 62 comprises four data sections in this embodiment, and therefore, when the XOR engine 322 performs the data checking process, there are four data sections in a processing set. In other words, each of the stripes is regarded as a processing set. Of course, N can be set as other values according to the practical requirements.

If the number of the XOR operations performed by the XOR operation module 3222 is smaller than the predetermined operation number N, i.e., 4, the XOR operation module 3222 continues to receive the next data section 612 (step S505). The XOR engine controller 3221 controls the multiplexing selector 3223 to output the XOR operation result stored in the buffer unit 3224 as the next XOR operation reference value for the XOR operation module 3222 to perform the XOR operation (step S502). Therein, the XOR operation result stored in the buffer unit 3224 is transferred to the multiplexing selector 3223 via the writing bus 3228. After that, the XOR engine 322 repeats steps. S502, S503 and S505 to perform the XOR operation on the data sections 612-614 continuously until the number of the XOR operations performed by the XOR operation module 3222 reaches the predetermined operation number N (4).

If the number of the XOR operations performed by the XOR operation module 3222 reaches the predetermined operation number N (4), which means the XOR operation module 3222 finishes performing the XOR operation on a processing set, i.e., all the data in a stripe, at this moment the XOR operation result of the XOR operation module 3222 is the operation result of the processing set. Namely, after the XOR operation module 3222 performs the XOR operation four times, the XOR operation result is regarded as the new parity data of the data sections 611-614. It should be noted that whether the content values of the new parity data are all zeros or not is still unable to determine at this moment.

Subsequently, the XOR engine controller 3221 determines whether the XOR operation result transferred to the OR operation unit 3225 is the XOR operation result of the first processing set, such as stripe 61, of the read data. If the XOR operation result received by the OR operation is the XOR operation result of the first processing set, the OR operation unit 3225 performs an OR operation on a predetermined operation value stored in itself together with the XOR operation result of the first processing set to obtain a check value, wherein in this embodiment, the predetermined operation value is set as "0". It means that the OR operation unit 3225 first utilizes the OR logic circuit 3253 to perform the OR operation on the XOR operation result of the first processing set outputted from the buffer unit 3224 with the predetermined operation value (0) and then outputs the OR operation result to one input of the OR logic circuit 3254. At this moment, the XOR engine controller 3221 controls the latch unit 3252 to output its predetermined value "0" to the other input of the OR logic circuit 3254. This makes the OR logic circuit 3254 further perform the OR operation on the OR operation result of the OR logic circuit 3253 together with the predetermined value '0' to obtain a check value of the processing set (step S504). After the OR operation unit 3225 finishes the OR operation, the obtained check value is temporarily kept in the latch unit 3252 as one value to be used in the next OR operation (step S507).

In this embodiment, every four data sections form a processing set, in which the data sections 614, 624 are parity data and the data sections 611-613, 621-623 are regular data. The data section 614 is generated by performing the XOR operation on the data sections 611-613. Similarly, the data section 624 is generated by performing the XOR operation on the data sections 621-623. Hence, performing the XOR operation on the data sections 611-614 of the same stripe 61 should generate an XOR operation result (new parity data) of which the content values are all equal to "0". In other words, if the read data sections 611-614 are correct, i.e., having data coherence, the content value of each of the new parity data must be "0". Thus, if the data sections 611-614 are correct, when the OR operation unit 3225 performs OR operation on the XOR operation result together with the predetermined operation value, the OR operation unit 3225 should obtain a check value equal to "0".

If the XOR operation result received by the OR operation unit 3225 is that of other processing sets, namely, not the XOR operation result of the first processing set, for example, the XOR operation result of the second stripe 62, the OR operation unit 3225 performs OR operation on the XOR operation result together with the check value stored in the latch unit 3252 to obtain a new check value (step S506). Then, the OR operation unit 3225 stores the new check value in the latch unit 3252 for next OR operation (step S507).

After the new check value is stored by the OR operation unit 3225, the XOR engine controller 3221 determines whether all of the processing sets have been checked or not. If not, the system checks the next processing set and hence repeats the steps S501, S502, S503, S505, S506 and S507 as described above. Similarly, since the data section 621 is the first data section of the stripe 62, the XOR operation module 3222 performs the XOR operation on the predetermined operation reference value "0" together with the data section 621. When the XOR operation unit 3220 finishes performing the XOR operation on the data sections 621-624 of the stripe 62, the XOR operation result is temporarily stored in the buffer unit 3224. Then, the buffer unit 3224 outputs the XOR operation result to the OR operation unit 3225. At this moment, the OR operation unit 3225 performs the OR operation on the XOR operation result together with the previous check value to output a new check value.

If all of the processing sets have been checked, the OR operation unit 3225 outputs the obtained check value (step S508). Since the check value is either "0" or "1", the XOR engine controller 3221 can determine the check result based on the check value after the XOR operation module 3222 finishes the XOR operations and the OR operation unit 3225 finishes the OR operations. If the check value is "0", which means the read data sections 611-614 of the stripe 61 and the read data sections 621-624 of the stripe 62 are correct, the XOR engine controller 3221 informs the CPU 323 to transfer the data sections 611-614 and sections 621-624 from the memory unit 321 to the host 31 (step S509). If the check value is "1", which means at least one of the content values of the read data sections 611-614 of the stripe 61 or the data sections 621-624 of the stripe 62 is erroneous and causes that the check value becomes "1" after the XOR operation and the OR operation are performed, the XOR engine controller 3221 informs the CPU 323 to perform a corresponding process against the data read error, such as reading the data again or regenerating the data by using the parity data (step S510).

In the above embodiments, the buffer unit 3224 of the XOR operation unit 3230 is controlled by the XOR engine controller 3221 to output the XOR operation result to the OR operation unit 3225 on the fly. That is, each time when the XOR operation unit 3230 finishes performing the XOR operation of a processing set, the XOR operation result is directly transferred to the OR operation unit 3225 rather than transferred to the memory unit 321 first and then read out from the memory unit 321 by the OR operation unit 3225 later. The system performance of the present invention is thereby greatly improved. In another aspect, the OR operation unit 3225 in the embodiment of the present invention is a circuit unit dedicated for OR operation without consuming the operation resource of the CPU 323 so that the system performance can be largely improved in comparison with earlier technologies.

In addition, although in the description mentioned above, a final check value generated after all processing sets are checked is used to determine whether or not an error exists in the read data or data to be checked, it is noted that the check value can be checked anytime during the checking process and the checked data is determined to be erroneous whenever the check value becomes "1".

Moreover, although in the description mentioned above, after all sections of a processing set are checked, the XOR operation result is then provided to the OR operation unit for performing OR operation, it is noted that the XOR operation result can be provided to the OR operation unit before the checking process of a processing set is completed and, in this case, the OR operation result based on such XOR operation result can still be used to determine that there is an error in the checked data if the check value becomes "1".

Furthermore, in the above embodiment, the processing set comprises exactly a stripe having four data chunks so that each read data section comprises one data chunk exactly. In practice, the processing set each, however, may comprise a plurality of stripes. In this case, each read data section of the processing set may comprise data chucks of stripes stored in a particular disk drive. In addition, the processing set may comprise only a partial stripe in case that the partial stripe comprises partial data chunks and that the regular data and the parity data thereof in the partial data chunks are completely matched between the partial chunks. Namely, the processing set comprises the regular data distributively stored in different data chucks and the parity data corresponding to the regular data. In this situation, a data section comprises the partial data chunk of a disk. Accordingly, it is easy to understand that a section of data may comprise not only an exact chunk of data, a multiple of chunks of data, and a portion of chunk of data, but also may comprise of several and a portion of a chunk of data. Moreover, a processing set of data may comprise an exact stripe of data, a multiple of stripes of data, and a portion of a stripe of data, and also may comprise of several and a portion of a stripe of data.

Of course, when data is transferred from the host to a disk drive or is read off from a disk drive to write into another disk drive, the method mentioned above can also be used to check the data coherence. That is not detailed here. The present invention can be applied to other storage systems if the read data or transferred data in the storage systems comprises regular data and its parity data (or the data having the same property of parity data). For example, in RAID 1, regular data (Db) is the same as the check data (Db'), i.e., mirrored data. Hence, performing XOR operation on the regular data (Db) together with the check data (Db') has the XOR operation result equal to zero. Hence, in an aspect of data coherence, the check data can be regarded as parity data. 20 Therefore, the XOR engine 322 of the present invention can also be used to check the data coherence when the regular data (Db) and the check data (Db') are read at the same time.

As the description above, when checking the coherence of data according to the present invention, the data to be checked is first read and stored in the memory unit and then XOR operation is performed on the data to be checked. After the XOR operation is performed on the data of a processing set completely, OR operation is then performed on the XOR operation result to obtain a check value. Thereafter, OR operation is further performed on the check value obtained together with the next XOR operation result and such actions are repeated until the XOR and OR operations are performed on all of the processing sets. Then, the check value is used to determine whether the data to be checked is correct or not. In this way, the present invention effectively checks the coherence of the data to be checked. In one embodiment of the present invention, the above XOR operation and OR operation can be performed by a CPU of the storage controller, which, more or less, lowers the system performance of the storage system. In an alternate embodiment of the present invention, the above XOR operation and OR operation can be performed by a dedicated XOR engine of the storage controller. In this way, the present invention effectively checks the coherence of the data to be checked without reducing the system performance.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An apparatus for checking data coherence, used to check a plurality of data to be checked, wherein the plurality of data to be checked can be arranged into at least one processing set and each of the at least one processing set comprises at least one regular data section and at least one XOR data section corresponding to the at least one regular data section, the apparatus comprising: an XOR operation unit for performing XOR operation on each of the at least one processing set to generate an XOR operation result; and, an OR operation unit for performing OR operation on the XOR operation result to generate an OR operation result, wherein the XOR operation unit comprises an XOR operation module for performing XOR operation on a first input data together with a second input data from a buffer unit, and an output generated by the XOR operation module is stored back into the buffer unit.

2. The apparatus as claimed in claim 1, wherein the XOR operation unit comprises an XOR operation module for performing XOR operation on a first input data together with a second input data.

3. The apparatus as claimed in claim 1, wherein each of the processing set comprises at least one stripe.

4. The apparatus as claimed in claim 1, wherein the each of the processing set comprises at least a portion of a stripe.

5. The apparatus as claimed in claim 1, further comprising a controlling unit to control the XOR operation unit and the OR operation unit.

6. The apparatus as claimed in claim 1, wherein the OR operation result generated by the OR operation unit is a check result of the data coherence checking.

7. The apparatus as claimed in claim 1, wherein the OR operation unit performs OR operation on the generated OR operation result together with a next generated XOR operation result of another of the at least one processing set.

8. An apparatus for checking data coherence, used to check a plurality of data to be checked, wherein the plurality of data to be checked can be arranged into at least one processing set and each of the at least one processing set comprises at least one regular data section and at least one XOR data section corresponding to the at least one regular data section, the apparatus comprising: an XOR operation unit for performing XOR operation on each of the at least one processing set to generate an XOR operation result; and, an OR operation unit for performing OR operation on the XOR operation result to generate an OR operation result, wherein the XOR operation unit comprises an XOR operation module for performing XOR operation on a first input data from one of the data sections together with a second input data from a selector, the second input data being selectively outputted from a buffer unit coupled to the XOR operation module or predetermined data.

9. An apparatus for checking data coherence, used to check a plurality of data to be checked, wherein the plurality of data to be checked can be arranged into at least one processing set and each of the at least one processing set comprises at least one regular data section and at least one XOR data section corresponding to the at least one regular data section, the apparatus comprising: an XOR operation unit for performing XOR operation on each of the at least one processing set to generate an XOR operation result; and, an OR operation unit for performing OR operation on the XOR operation result to generate an OR operation result, wherein the OR operation unit comprises a temporary storage unit to keep the OR operation result.

10. The apparatus as claimed in claim 9, wherein the temporary storage unit is a Flip-Flop.

11. The apparatus as claimed in claim 9, wherein the XOR operation unit comprises an XOR operation module for performing XOR operation on a previously generated XOR operation result together with another one of the data sections to generate a new XOR operation result.

12. An apparatus for checking data coherence, used to check a plurality of data to be checked, wherein the plurality of data to be checked can be arranged into at least one processing set and each of the at least one processing set comprises at least one regular data section and at least one XOR data section corresponding to the at least one regular data section, the apparatus comprising: an XOR operation unit for performing XOR operation on each of the at least one processing set to generate an XOR operation result; and, an OR operation unit for performing OR operation on the XOR operation result to generate an OR operation result, wherein the OR operation unit performs the OR operation on the fly.

13. An apparatus for checking data coherence, used to check a plurality of data to be checked, wherein the plurality of data to be checked can be arranged into at least one processing set and each of the at least one processing set comprises at least one regular data section and at least one check data section corresponding to the at least one regular data section, the apparatus comprising: an XOR operation module for receiving a first input data and a section of the data to be checked and performing XOR operation on the first input data together with the section of the data to be checked to generate an XOR operation result; a buffer unit for storing the XOR operation result and outputting the XOR operation result to the XOR operation module as a second input data so that the XOR operation module performs XOR operation on the second input data together with a next section of the data to be checked; and, an OR operation unit for receiving the XOR operation result of each of the at least one processing set to perform OR operation so as to generate an OR operation result; wherein the buffer unit provides the XOR operation result of the at least one processing set to the OR operation unit to perform OR operation, and the OR operation unit performs OR operation on the generated OR operation result together with the XOR operation result of next of the at least one processing set.

14. The apparatus as claimed in claim 13, wherein the buffer unit provides the XOR operation result of the processing set to the OR operation unit when the XOR operation has been performed a number of times equal to a number of data sections in the processing set.

15. The apparatus as claimed in claim 13, wherein when a first data section of each the processing set is received, the XOR operation module performs the XOR operation on the first input data together with the first data section.

16. The apparatus as claimed in claim 13, further comprising a selector, which is arranged between the XOR operation module and the buffer unit so that the first input data or the second input data can be selectively provided by the selector for inputting to the XOR operation module.

17. The apparatus as claimed in claim 13, wherein the OR operation result generated by the OR operation unit is a check result of the data coherence checking.

18. A method for checking data coherence, used to check a plurality of data to be checked, wherein the plurality of data to be checked can be arranged into at least one processing set and each of the at least one processing set comprises at least one regular data section and at least one check data section corresponding to the at least one regular data section, the method comprising the steps of: performing XOR operation on the data to be checked of each of the at least one processing set to generate an XOR operation result; and, performing OR operation on the XOR operation result to generate an OR operation result, wherein said step of performing XOR operation on the data to be checked comprises the following step: performing XOR operation on a first input data from the processing set together with a second input data from a buffer unit; and wherein after performing the XOR operation, an output data is generated and stored back into the buffer unit.

19. The method as claimed in claim 18, wherein each of the processing set comprises at least one stripe.

20. The method as claimed in claim 18, wherein the each of the processing set comprises at least a portion of a stripe.

21. The method as claimed in claim 18, further comprising: utilizing a controlling unit to control the XOR operation unit and the OR operation unit.

22. The method as claimed in claim 18, further comprising: storing the OR operation result in a temporary storage unit.

23. The method as claimed in claim 18, wherein an XOR operation module is used to perform the step of performing XOR operation.

24. The method as claimed in claim 18, wherein the step of performing XOR operation is performed by using an XOR operation unit.

25. The method as claimed in claim 18, wherein the step of performing OR operation is performed by using an OR operation unit.

26. The method as claimed in claim 18, wherein the performing OR operation step is performed by performing the OR operation on the XOR operation result of the processing set when a number of performing the XOR operation reaches a predetermined operation number.

27. The method as claimed in claim 18, wherein the predetermined operation number equals to number of data sections of the processing set.

28. The method as claimed in claim 18, wherein the OR operation result generated by the performing the OR operation step is a check result of the data coherence checking.

29. A method for checking data coherence, used to check a plurality of data to be checked, wherein the plurality of data to be checked can be arranged into at least one processing set and each of the at least one processing set comprises at least one regular data section and at least one check data section corresponding to the at least one regular data section, the method comprising the steps of: performing XOR operation on the data to be checked of each of the at least one processing set to generate an XOR operation result; and, performing OR operation on the XOR operation result to generate an OR operation result, wherein the step of performing the XOR operation is performed by an XOR operation module, and the step of performing the XOR operation further comprises: selectively outputting a second input data or predetermined data to the XOR operation module.

30. The method as claimed in claim 29, wherein the step of performing XOR operation on the data to be checked comprises a step of performing XOR operation on a previously generated XOR operation result together with another one of the data sections to generate a new XOR operation result.

31. A method for checking data coherence, used to check a plurality of data to be checked, wherein the plurality of data to be checked can be arranged into at least one processing set and each of the at least one processing set comprises at least one regular data section and at least one check data section corresponding to the at least one regular data section, the method comprising the steps of: performing XOR operation on the data to be checked of each of the at least one processing set to generate an XOR operation result; and, performing OR operation on the XOR operation result to generate an OR operation result, wherein said step of performing XOR operation on the data to be checked comprises the following step: performing XOR operation on a first input data from the processing set together with a second input data from a buffer unit; and wherein the step of performing OR operation on the XOR operation result is performed on the fly.

32. A method for checking data coherence, used to check a plurality of data to be checked, wherein the plurality of data to be checked can be arranged into at least one processing set and each of the at least one processing set comprises at least one regular data section and at least one check data section corresponding to the at least one regular data section, the method comprising the steps of: performing XOR operation on the data to be checked of each of the at least one processing set to generate an XOR operation result; and, performing OR operation on the XOR operation result to generate an OR operation result, wherein said step of performing XOR operation on the data to be checked comprises the following step: performing XOR operation on a first input data from the processing set together with a second input data from a buffer unit; and wherein the step of performing OR operation on the XOR operation result comprises a step of performing OR operation on the new OR operation result together with a next generated XOR operation result of another of the at least one processing set.

33. A redundant array of independent disk drives (RAID) controller, comprising: a memory unit for storing data of at least one processing set of data to be checked; and, an XOR engine for checking the data of the at least one processing set; wherein the XOR engine comprises: an XOR operation module for performing XOR operation on each of the processing set to generate an XOR operation result; and, an OR operation unit for performing OR operation on the XOR operation result to generate an OR operation result, wherein the XOR operation unit comprises an XOR operation module for performing the XOR operation on a first input data from the at least one processing set together with a second input data from a buffer unit, and the XOR operation module comprises an output coupled to the buffer unit.

34. The RAID controller as claimed in claim 33, wherein each the processing set comprises at least one stripe.

35. The RAID controller as claimed in claim 33, wherein the each the processing set comprises at least a portion of a stripe.

36. The RAID controller as claimed in claim 33, wherein the XOR engine further comprises a controlling unit to control the XOR operation unit and the OR operation unit.

37. The RAID controller as claimed in claim 33, wherein the data to be checked in the at least one processing set each comprises at least one regular data section and at least one check data section corresponding to the at least one regular data section, wherein after the XOR operation module performs XOR operation on first of the data sections to generate a first XOR operation result, the XOR operation module performs XOR operation on a latest generated XOR operation result together with another one of the data sections to generate a new XOR operation result.

38. The RAID controller as claimed in claim 33, wherein the OR operation unit performs OR operation on the generated OR operation result together with a next generated XOR operation result of another of the at least one processing set.

39. A redundant array of independent disk drives (RAID) controller, comprising: a memory unit for storing data of at least one processing set of data to be checked; and, an XOR engine for checking the data of the at least one processing set; wherein the XOR engine comprises: an XOR operation module for performing XOR operation on each of the processing set to generate an XOR operation result; and, an OR operation unit for performing OR operation on the XOR operation result to generate an OR operation result, wherein the XOR operation unit comprises a selector for selectively outputting to the XOR operation module the second input data from the buffer unit or predetermined data.

40. A redundant array of independent disk drives (RAID) controller, comprising: a memory unit for storing data of at least one processing set of data to be checked; and, an XOR engine for checking the data of the at least one processing set; wherein the XOR engine comprises: an XOR operation module for performing XOR operation on each of the processing set to generate an XOR operation result; and, an OR operation unit for performing OR operation on the XOR operation result to generate an OR operation result, wherein the OR operation unit comprises a temporary storage unit to store the OR operation result.

41. The RAID controller as claimed in claim 40, wherein the temporary storage unit is a Flip-Flop.

42. The RAID controller as claimed in claim 40, wherein after the XOR operation module has performed the XOR operation on all the data sections of one of the at least one processing set, the OR operation unit performs OR operation on the XOR operation result.

43. A redundant array of independent disk drives (RAID) controller, comprising: a memory unit for storing data of at least one processing set of data to be checked; and, an XOR engine for checking the data of the at least one processing set; wherein the XOR engine comprises: an XOR operation module for performing XOR operation on each of the processing set to generate an XOR operation result; and, an OR operation unit for performing OR operation on the XOR operation result to generate an OR operation result, wherein the OR operation unit performs OR operation on the XOR operation result on the fly.

44. A data storage subsystem, comprising: a data storage apparatus for providing data storage space; and, a controller coupled to the data storage apparatus, the controller comprising: a memory unit for storing a plurality of data to be checked, wherein the plurality of data to be checked can be arranged into at least one processing set, and each of the at least one processing set comprises at least one regular data section and at least one check data section corresponding to the at least one regular data section; and, a data coherence checking unit for checking coherence of the data to be checked, the data coherence checking unit further comprises: an XOR operation unit for performing XOR operation on data of each the processing set to generate an XOR operation result corresponding to the at least one processing set; and, an OR operation unit for performing OR operation on the XOR operation result of the at least one processing set so as to generate an OR operation result, wherein the XOR operation unit comprises an XOR operation module for performing the XOR operation on a first input data from the at least one processing set together with a second input data from a buffer unit, and the XOR operation module comprises an output coupled to the buffer unit.

45. A data storage subsystem, comprising: a data storage apparatus for providing data storage space; and, a controller coupled to the data storage apparatus, the controller comprising: a memory unit for storing a plurality of data to be checked, wherein the plurality of data to be checked can be arranged into at least one processing set, and each of the at least one processing set comprises at least one regular data section and at least one check data section corresponding to the at least one regular data section; and, a data coherence checking unit for checking coherence of the data to be checked, the data coherence checking unit further comprises: an XOR operation unit for performing XOR operation on data of each the processing set to generate an XOR operation result corresponding to the at least one processing set; and, an OR operation unit for performing OR operation on the XOR operation result of the at least one processing set so as to generate an OR operation result, wherein the XOR operation unit further comprises a selector for selectively outputting the second input data or predetermined data to the XOR operation module.

46. A data storage system, comprising: a host; a data storage apparatus for providing data storage space; and, a controller coupled between the host and the storage apparatus, the controller comprising: a memory unit for storing a plurality of data to be checked, wherein the plurality of data to be checked can be arranged into at least one processing set each comprises at least one regular data section and at least one check data section corresponding to the at least one regular data section; and, a data coherence checking unit for checking coherence of the data to be checked, the data coherence checking unit comprising: an XOR operation unit for performing XOR operation on data of each of the at least one processing set to generate a corresponding XOR operation result; and, an OR operation unit for receiving the XOR operation result of the at least one processing set to perform OR operation so as to generate an OR operation result, wherein the XOR operation unit comprises an XOR operation module for performing the XOR operation on a first input data from the at least one processing set together with a second input data from a buffer unit, and the XOR operation module comprises an output coupled to the buffer unit.

47. A data storage system, comprising: a host; a data storage apparatus for providing data storage space; and, a controller coupled between the host and the storage apparatus, the controller comprising: a memory unit for storing a plurality of data to be checked, wherein the plurality of data to be checked can be arranged into at least one processing set each comprises at least one regular data section and at least one check data section corresponding to the at least one regular data section; and, a data coherence checking unit for checking coherence of the data to be checked, the data coherence checking unit comprising: an XOR operation unit for performing XOR operation on data of each of the at least one processing set to generate a corresponding XOR operation result; and, an OR operation unit for receiving the XOR operation result of the at least one processing set to perform OR operation so as to generate an OR operation result, wherein the XOR operation unit further comprises a selector for selectively outputting the second input data or predetermined data to the XOR operation module.

48. A data storage system, comprising: a host; a data storage apparatus for providing data storage space; and, a controller coupled between the host and the storage apparatus, the controller comprising: a memory unit for storing a plurality of data to be checked, wherein the plurality of data to be checked can be arranged into at least one processing set each comprises at least one regular data section and at least one check data section corresponding to the at least one regular data section; and, a data coherence checking unit for checking coherence of the data to be checked, the data coherence checking unit comprising: an XOR operation unit for performing XOR operation on data of each of the at least one processing set to generate a corresponding XOR operation result; and, an OR operation unit for receiving the XOR operation result of the at least one processing set to perform OR operation so as to generate an OR operation result, wherein the XOR operation unit further comprises an XOR operation module and a selector; the XOR operation module is used for performing the XOR operation on a first input data from the at least one processing set comprising at least a portion of a stripe together with a second input data from a buffer unit, and the XOR operation module comprises an output coupled to the buffer unit; the selector is used for selectively outputting the second input data or predetermined data to the XOR operation module; the buffer unit outputs the XOR operation result of the processing set to the OR operation unit when a number of performing the XOR operation reaches a predetermined operation number which equals to a number of the data sections of the processing set; the OR operation result generated by the OR operation unit is a check result of the data coherence checking; the data coherence checking unit further comprises a controlling unit for controlling the XOR operation unit and the OR operation unit; and the OR operation unit comprises a temporary storage unit which is a Flip-Flop to store the OR operation result.

* * * * *